Dec. 23, 1952        S. VELOTTA        2,622,384
EDGER AND TRIMMER ATTACHMENT FOR MOWERS
Filed July 6, 1948        7 Sheets-Sheet 1

Fig. 1

Inventor
Salvatore Velotta

By
E. V. Hardway
Attorney

Dec. 23, 1952 S. VELOTTA 2,622,384
EDGER AND TRIMMER ATTACHMENT FOR MOWERS
Filed July 6, 1948 7 Sheets-Sheet 3

Inventor
Salvatore Velotta
Attorney
By E. V. Hardway.

Dec. 23, 1952 S. VELOTTA 2,622,384
EDGER AND TRIMMER ATTACHMENT FOR MOWERS
Filed July 6, 1948 7 Sheets-Sheet 4

Inventor
Salvatore Velotta.

By
Attorney
E. V. Hardway

Dec. 23, 1952   S. VELOTTA   2,622,384
EDGER AND TRIMMER ATTACHMENT FOR MOWERS
Filed July 6, 1948   7 Sheets—Sheet 5

Inventor
Salvatore Velotta

By

Attorney
E. V. Hardway

Dec. 23, 1952 S. VELOTTA 2,622,384
EDGER AND TRIMMER ATTACHMENT FOR MOWERS
Filed July 6, 1948 7 Sheets-Sheet 6

Fig. 9

Inventor
Salvatore Velotta

By
Attorney
E. V. Hardway.

Dec. 23, 1952 — S. VELOTTA — 2,622,384
EDGER AND TRIMMER ATTACHMENT FOR MOWERS
Filed July 6, 1948 — 7 Sheets-Sheet 7

Inventor
Salvatore Velotta

By E. V. Hardway, Attorney

Patented Dec. 23, 1952

2,622,384

UNITED STATES PATENT OFFICE 2,622,384

EDGER AND TRIMMER ATTACHMENT FOR MOWERS

Salvatore Velotta, Houston, Tex.

Application July 6, 1948, Serial No. 37,180

12 Claims. (Cl. 56—251)

This invention relates to an edger and trimmer attachment for mowers.

An object of the invention is to provide an edger and trimmer which is applicable to mowers particularly lawn mowers of the power driven type.

It is another object of the present invention to provide edging and trimming equipment of the character described which may be readily adjusted to different elevations as well as to positions at the rear or in front of the lawn mower.

In one form of the invention the cutting blade operates in a vertical plane and is thus particularly adapted for edging lawns and the like while in another embodiment of the invention the cutting blade operates in a horizontal plane and in front of the lawn mower and therefore is specially adapted for reaching and trimming areas that are inaccessible to the cutter of the lawn mower proper.

In both forms of the invention the edger or trimmer may be adjusted to an inoperative position and there maintained while the lawn mower is being used to cut the lawn in the usual way.

Another feature of the invention embodies a novel type of clutch which may be manually controlled to drive either the blade of the edger or trimmer or the cutting mechanism of the lawn mower proper, alternatively.

Other objects and advantages will be apparent from the following specification which is illustrated by the accompanying drawings, wherein.

Referring now more particularly to the drawings, wherein like numerals of reference designate the same parts in each of the figures, the numeral 1 designates the framework of the mower as a whole. This framework is supported in the conventional manner on the carrier wheels 2, 2 and there is a transverse shaft 3 mounted to rotate in the frame and supporting the conventional, spiralled cutter blades 3a.

Mounted in aligned bearings of the upstanding brackets 4 there is a drive shaft 5. These brackets are fixed to and upstand from the framework 1.

Fixed on one end of the shaft 5 there is a driving sprocket wheel 6 and aligned therewith and fixed on the shaft 3 there is a driven sprocket wheel 7 and operating over these sprocket wheels and transmitting rotation from the former to the latter there is a driving sprocket chain 8.

Figure 1:
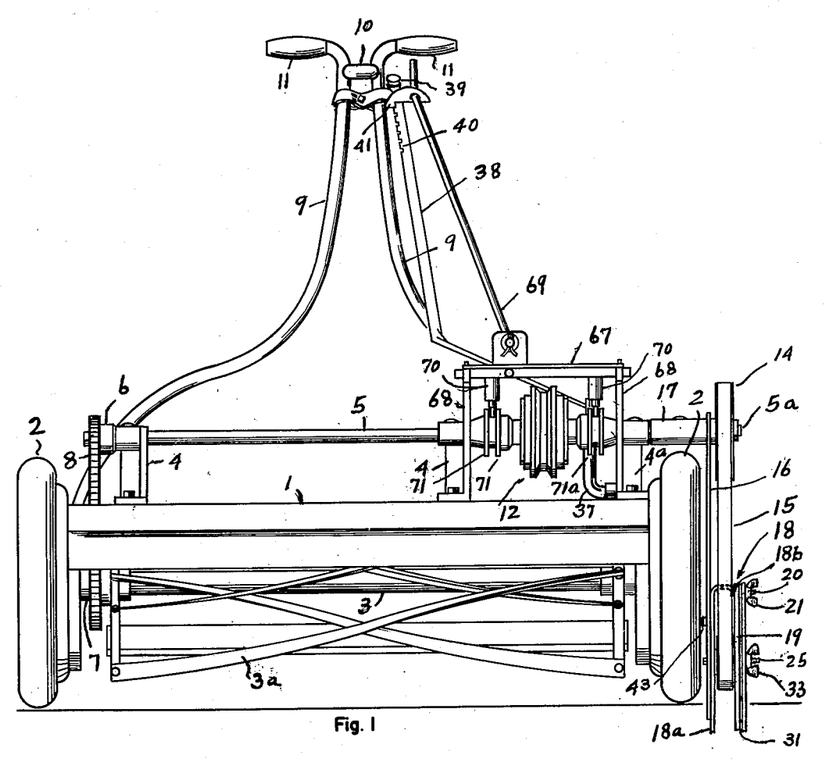
Figure 1 is a front elevation of a conventional power type of lawn mower with the motor removed and showing the edger mounted in place.
Figures 2, 3:
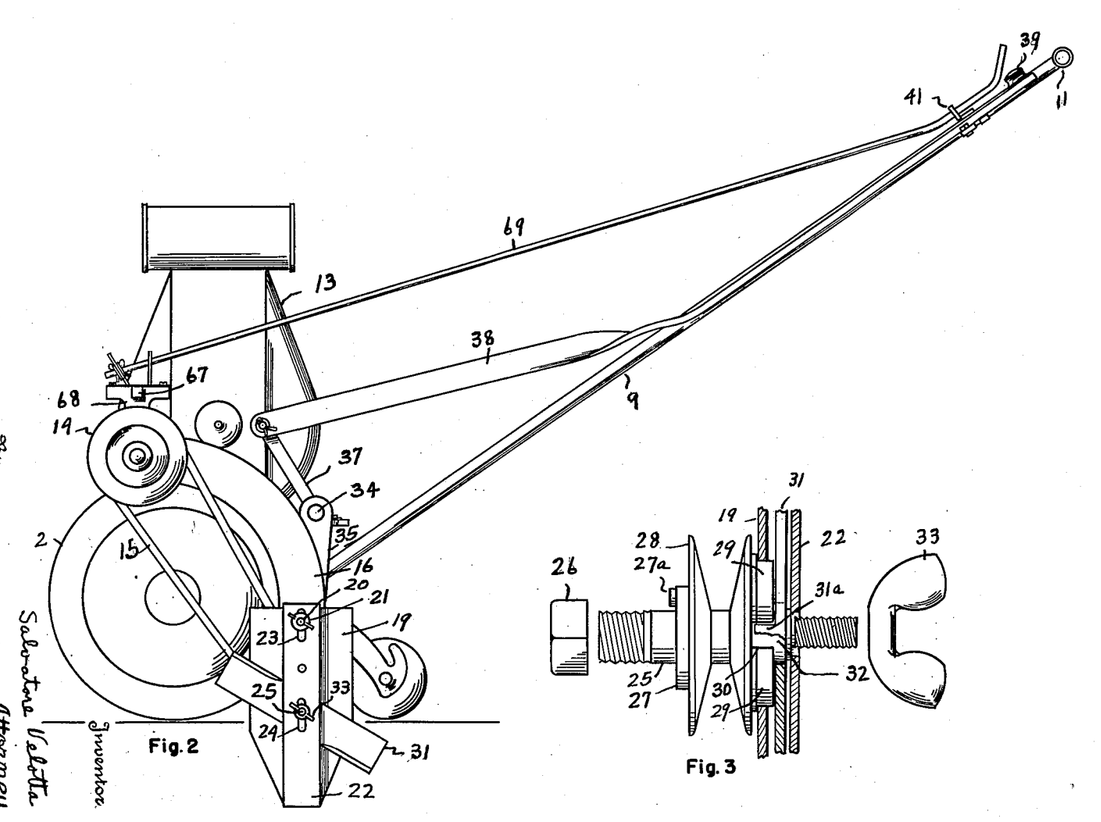
Figure 2 is a side elevation showing the motor installed.
Figure 3 is an elevational view, on an enlarged scale, of a type of driving pulley employed, showing associated parts in section.

The machine is equipped with the guide handles 9, 9 whose forward ends are connected to the ends of the framework 1 in the usual manner. These handles converge rearwardly, as shown in Figure 1, and their rear ends are connected by a bracket 10 and rearwardly of said bracket there are the outwardly turned grip members 11, 11, as best shown in Figures 1 and 2.

Aligned with the shaft 5 and mounted to rotate in a bracket 4a, which upstands from the framework and which is aligned with the brackets 4, there is a driving shaft 5a which has been provided to drive the edger and trimmer mechanism.

Mounted on the adjacent ends of the shafts 5, 5a there is a pulley 12 which may be alternatively clutched with either of the shafts 5 or 5a so as to drive the cutter of the mowing machine or the edger or the trimmer mechanism as desired. This pulley and the associated clutch mechanism will be hereinafter described more in detail.

Mounted on the mower framework there is a motor 13. As illustrated this motor is of the internal combustion type and is equipped with suitable driving mechanism including a driving belt which operates over the pulley 12 to drive the latter.

With the pulley 12 clutched with the shaft 5 the mower proper will be driven in the usual way for cutting grass; but with the pulley 12 clutched with the driving shaft 5a the edger or the trimmer will be driven.

Fixed on the outer end of the shaft 5a there is a pulley 14 and operating over this pulley and driven thereby there is a driving belt 15.

The edger mechanism disclosed in Figures 1 to 5, inclusive, will now be described: The numeral 16 designates an arcuate supporting arm whose upper end is provided with an integral elongated bearing 17 which is rotatable on the shaft 5a and whose free end carries a frame designated generally by the numeral 18 and which is of the inverted U-shaped form.

One arm 18a of this frame is elongated and extends down beneath the surface on which the mower travels, during the edging operation, as indicated in Figure 1, and the other arm 18b of said frame is relatively short. There is a stationary, relatively wide blade 19 whose upper end is attached to the arm 18b and whose side margins, at the lower end of the blade converge downwardly as indicated in Figure 2.

The upper end of the blade 19 is secured in place by means of a bolt 20 whose inner end is secured to the arm 18b and this bolt 20 extends through an opening 19a in the upper end of the blade 19 and its outer end is threaded to receive a securing nut 21.

There is a vertically elongated guard plate 22 which is provided with upper and lower vertical slots 23, 24. The bolt 20 extends through the upper slot 23 and the nut 21 clamps against said upper end of said guard plate.

There is a bolt 25 whose inner end is fitted through a suitable bearing in the arm 16 and secured in place by means of nut 26 which is threaded onto the inner end of said bolt and clamps against the arm 16. This bolt 25 has an enlarged annular rib or flange 27 formed integrally therewith and whose inner side has an integral key 27a which fits into an aligned keyway in the arm 18a. A pulley 28 is rotatably mounted on the bolt 25. One end of this pulley is in abutting relation with the flange 27 and its other end is provided with arcuate outstanding flanges 29, 29 whose ends are spaced apart to form oppositely disposed keyways, as 30.

The cutter blade 19 is provided with a bearing to receive said flanges 29 and adjacent the arm 19 there is a rotatable cutter bar 31 which is provided with a bearing, midway its ends, to receive the adjacent end of the extended hub 32 of the pulley 28 and said cutter bar 31 has overturned lugs 32 which fit into the notches 30 so that as the pulley 28 is rotated the cutter bar 31 will rotate with it. The adjacent end of the bolt 25 is reduced and externally threaded and extends through the vertical slot 24 of the guard 22. Threaded onto said outwardly threaded end of the bolt there is a clamp nut 33 which when screwed up clamps the guard 22 closely against an external shoulder on said bolt 25 so that the guard 22 will be held secured in place but will not clamp against the cutter blade 31 so as to prevent it from rotation.

The driving belt 15 operating over the pulley 14 as hereinabove explained operates also over the pulley 28 and transmits rotation to the latter pulley and to the cutter blade 31 operatively connected therewith.

When the mowing machine is driven along the turf, adjacent the margin of a concrete sidewalk or other similar walk in order to guard the cutter 31 and prevent it from coming into contact with the walk nuts 21 and 33 may be loosened and the guard 22 moved downwardly to its lower position and said nuts then again tightened up; but when the mowing machine is being moved along the sidewalk and the cutter blade 31 is on the side toward the turf said nuts may be loosened and the guard elevated and secured in elevated position.

Mounted on the framework of the mower there is an adjustable bell crank comprising a transverse stub shaft 34 fixed to one end of which there is an arm 35 having a longitudinal slot 36 and whose other end is upturned forming an arm 37. The arm 35 may be adjusted, relative to the shaft 34, in any conventional manner, and then secured at any selected point of adjustment. There is a control bar, or handle, 38 whose forward end is pivoted to the free end of the arm 37 and whose rear end is provided with a hand knob 39 whereby said handle 38 may be manipulated forwardly or rearwardly and this handle 38 has a series of marginal notches 40 engageable with a suitable dog 41 carried by the handles 9 whereby said handle may be maintained at any selected point of adjustment.

It may be here stated that the arm 35 of the bell crank, may be maintained at any selected point of adjustment, relative to shaft 34, by means of a set screw, as 42.

In the assembly as shown in Figure 1 to 4 the slot 36 of the arm 35 loosely receives a boss 43 on the inner side of the arm 16 and whose outer end is enlarged to retain said arm.

Figure 4:
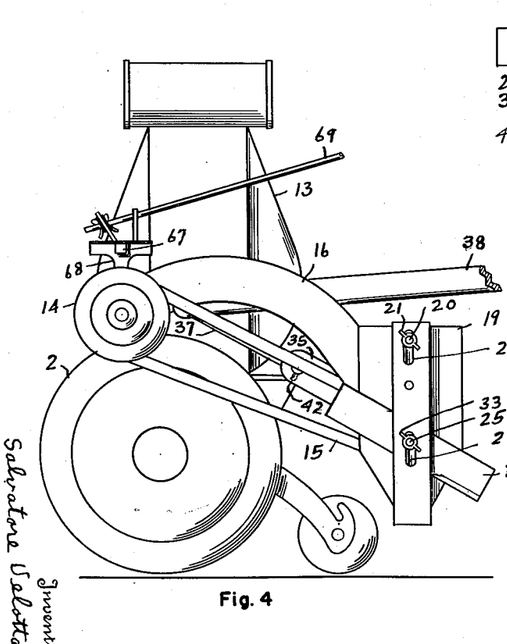
Figure 4 is an end elevation of the machine showing the edger in inactive position.

Should it be desired to elevate the edger or the trimmer mechanism the control bar 38 may be moved forwardly, as desired, and this will move the arm 37 forwardly and downwardly and will swing the arm 35 rearwardly, as shown in Figure 4. This may be found desirable when it is desired to trim at an elevation above the surface on which the mower is moving. This elevation may be varied by loosening the set screw 42 and varying the relationship of the arm 35 to shaft 34.

Figure 5:
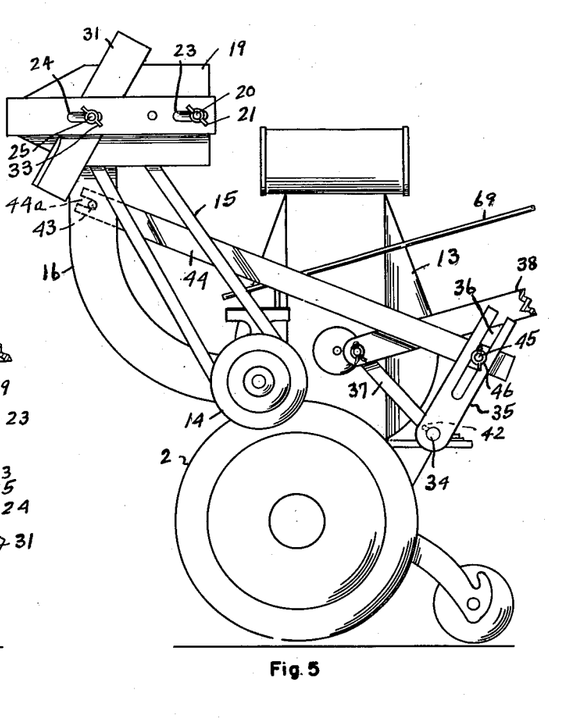
Figure 5 is an end elevation showing the edger in elevated, or inactive position.

At times it may be found desirable to use the edger attachment for trimming at an elevation as, for example for trimming the sides of hedges and the like. This position of the edger is shown in Figure 5. When maintained in this elevated position an additional cross link, as 44, is employed one end of which has a slot 44a to receive the stud 43 whereby said link 44 is pivotally connected, at said end, to the supporting arm 16, near its free end, and the other end of the link 44 is provided with a bolt 45 therethrough and clamped thereto and one end of which extends through slot 36 and is outwardly threaded to receive a retaining nut 46. When used in this manner the bell crank arm 35 is reversed, in position, with respect to its position shown in Figure 2, and the bolt 45 is fitted through the slot 36 of the arm 35 so as to connect the end of the link to said arm 35. By adjusting the handle, or control bar, 38 forwardly or rearwardly, the position of the edger or the trimmer attachment may be varied in an obvious manner.

Figure 6:
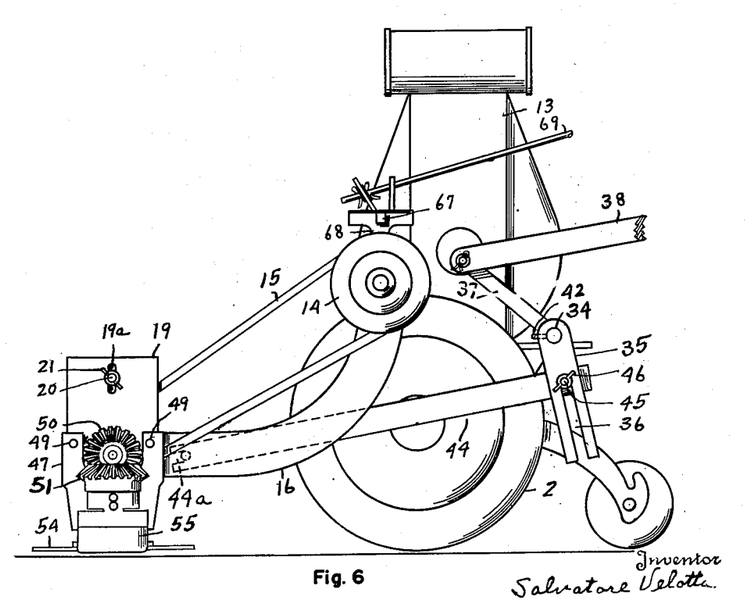
Figure 6 is an end elevation showing an embodiment of the trimmer having a horizontal blade.

It may also be found desirable to adjust the edger or the trimmer attachment to a position directly in front of the lawn mower and this may be done as indicated in Figure 6. While in this position the relation of the arms 35, 37 will be substantially the same, as that shown in Figure 2, with the free end of the arm 35 extended downwardly and with the rear end of the link 44 connected to the arm 35 in the same manner as shown in Figure 5 and as explained in connection with the description of said figure and the forward end of the link 44 will be pivotally connected to the forward end of the supporting arm 16. When in this position the edger or the trimmer will be in advance of the mower and will therefore reach areas that would otherwise be inaccessible to it.

Figures 7, 8:
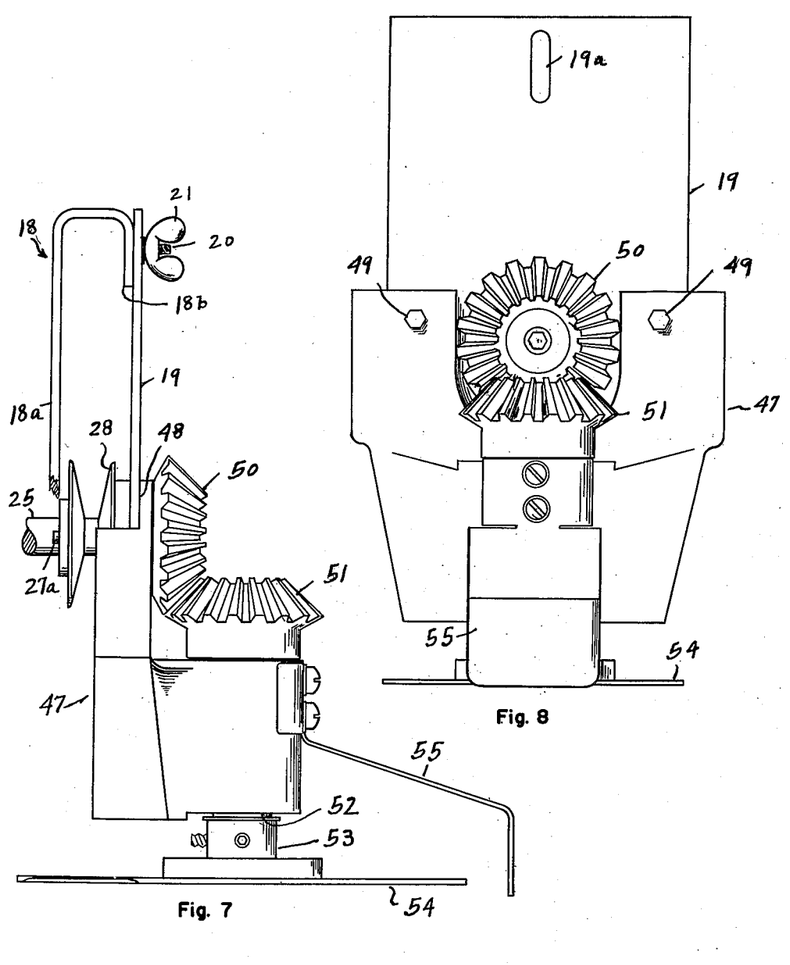
Figure 7 is a front elevation, on an enlarged scale, of the trimmer mechanism having a horizontal type blade and showing the driving mechanism therefor.
Figure 8 is a side elevation thereof.
Figure 7A:
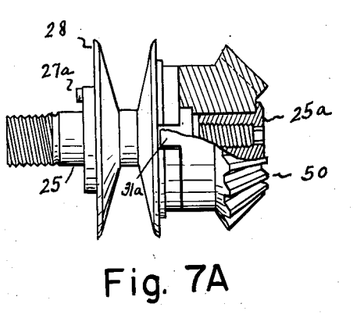
Figure 7A is a fragmentary sectional view thereof.

The type of edger mechanism shown in Figures 1 to 5, inclusive, may be thus positioned in front of the lawn mower or the type of trimmer illustrated in Figures 6, 7 and 8 may be connected to the blade 19 in lieu of the guard plate 22 and cutter bar 31.

The method of such connection and specific construction of the horizontal type of trimmer will now be explained in detail.

There is a frame designated generally by the numeral 47 and preferably formed integrally. This frame is formed with a vertical slot 48 in its rear side shaped to receive the lower end of the blade 19 and to which blade said frame 47 may be secured by suitable bolts, as 49, 49. The lower portion of the frame is thickened forwardly as best illustrated in Figure 7. Threaded onto the outer, or reduced, end of the bolt 25 there is a bushing 25a which has an outer end flange and mounted on said bushing and connected to the pulley 28 to rotate therewith in a manner similar to the connection of blade 31 thereto there is a bevel pinion 50 which is retained on the bushing by said flange and is in mesh with and drives a bevel pinion 51 which is fixed on the upper end of a vertical shaft 52 which is suitably mounted in a vertical bearing in the forward portion of the frame 47, as indicated in Figure 7.

Detachably secured to the lower end of shaft 52 there is a hub 53 whose lower end carries a cutter blade 54 which rotates in a horizontal plane. In this form the pulley 28 is driven by the belt 15, as in the form shown in Figures 1 and 2. The cutter blade 54 is driven at a high rate of speed and in parallel relationship with the surface of the cut and as is obvious otherwise inaccessible places may be reached by it.

Secured to the forward side of the frame 47 and extending laterally therefrom there is a guard 55 whose free end is downwardly turned thus forming a stop, or bumper, to come in contact with stationary objects alongside the cutter blade 54 so as to shield said cutter blade from coming into contact with said objects and becoming broken or injured.

As is obvious by removing the bolts 49 this form of trimmer attachment may be removed and the form of edger shown in Figures 1 and 2 installed.

As hereinabove indicated the driving motor may be clutched with either the shaft 5 to drive the lawn mower proper or with the shaft 5a to drive the edger or the trimmer mechanism. The clutch operating mechanism and the clutch details are shown in Figure 1 and Figures 9 to 12, inclusive, and will now be described in detail: The pulley 12 is driven by means of the conventional belt which, in turn, is driven from the motor 13 so that while either the lawn mower or the edger or the trimmer mechanism are being operated this pulley 12 is being driven.

Figure 9:
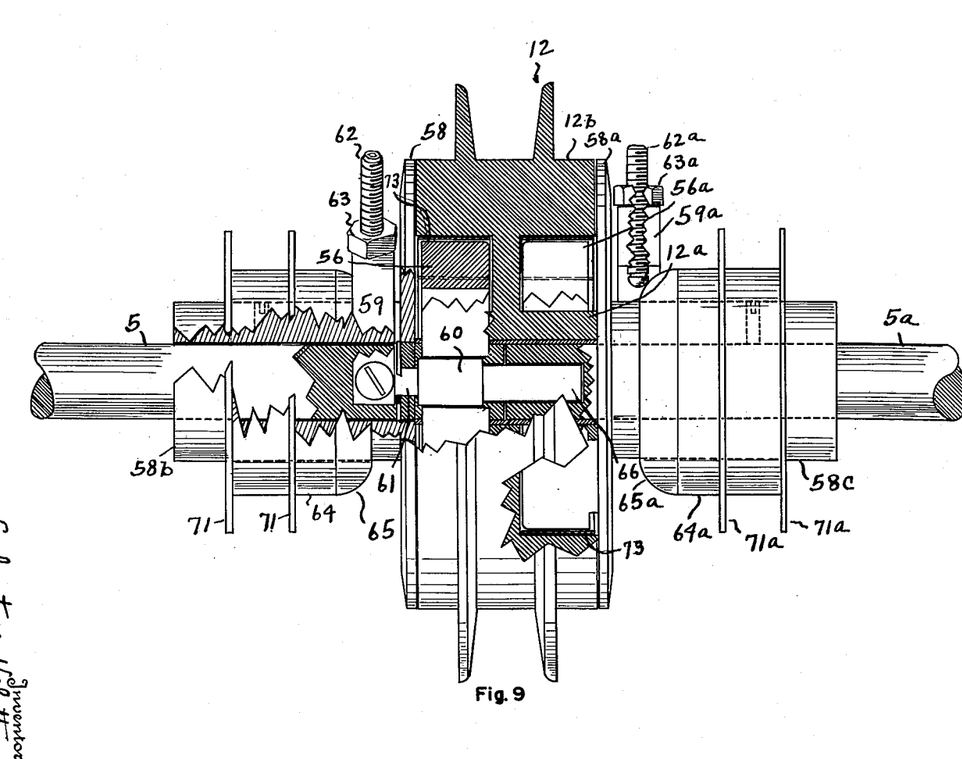
Figure 9 is an elevational view, on an enlarged scale, of a type of clutch employed shown partly in section.
Figure 10:
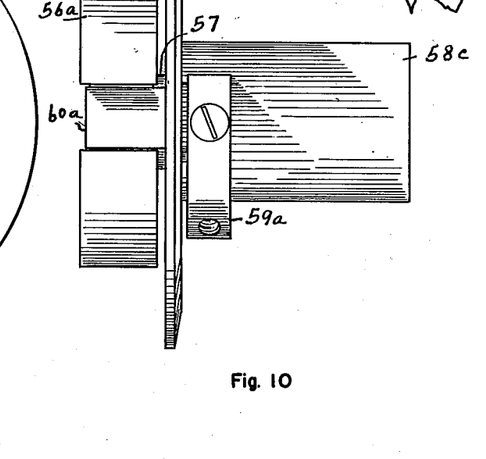
Figure 10 is a side elevation, on an enlarged scale, of the clutch controlling mechanism.
Figure 11:
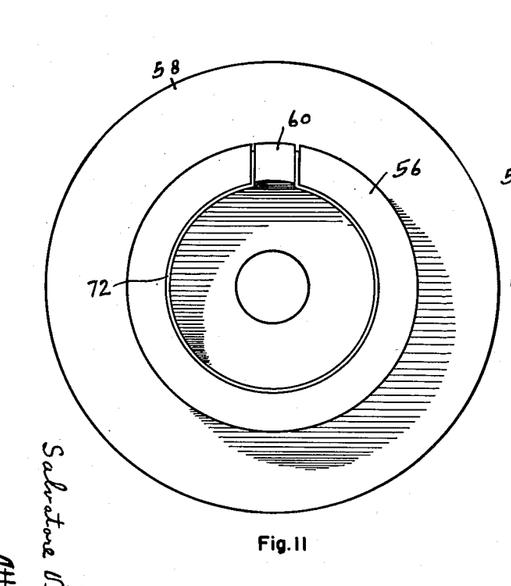
Figure 11 is an end elevation thereof.
Figure 12:
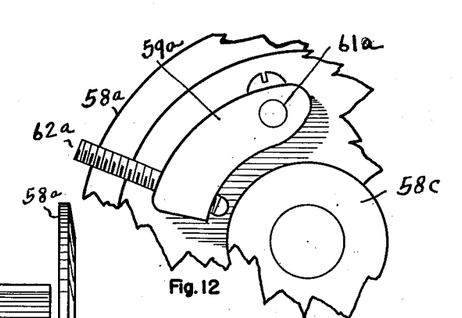
Figure 12 is a fragmentary end view, on an enlarged scale, of the clutch mechanism.

The pulley 12 has an elongated hub 12a into which the adjacent ends of the shafts 5, 5a fit and within the pulley 12 around the respective ends of the hub there are the friction type clutch rings 56, 56a which are normally out of contact with the pulley 12 but which may be alternately expanded into clutching relation with said pulley. As is shown in Figure 9 both friction rings are contracted and the shafts 5, 5a are consequently idle. The friction rings are approximately circular but open at one side with their ends spaced apart, as shown in Figures 10 and 11. It will be noted from an inspection of Figure 10 that united to each friction ring, by means of bridges, as 57, there are the annular end plates 58, 58a, having the outwardly extended hubs 58b and 58c which are secured to shafts 5, 5a in any approved manner as by set screws. The bridges 57 are relatively narrow and are diametrically opposite the open ends of the friction rings 56, 56a so that said friction rings can readily expand or contract and on the outer sides of the plates 58, 58a there are the arcuate levers 59, 59a.

Fitted, rather snugly between the free ends of the friction rings 56, 56a there are the expanders 60, 60a, rectangular in cross section, and having reduced cylindrical shanks 61, 61a which work through bearings in the plates 58, 58a and to the outer ends of which the arcuate actuating levers 59, 59a, respectively, are secured at one end.

Threaded, radially through the other or free ends of the levers 59, 59a, are the lever actuating bolts 62, 62a which are adjustable, radially, and which may be locked at any point of adjustment by the lock nuts 63, 63a screwed thereon.

Slidable on the hubs 58b and 58c are the clutch actuators 64, 64a whose inner, or facing, ends have the inwardly tapering bearing faces 65, 65a arranged to operate against the inner ends of the corresponding actuating bolts 62, 62.

Upon inward movement of an actuator its tapering face will engage the inner end of the corresponding actuating bolt and swing the free end of the actuating lever 59 or 59a, as the case may be, outwardly and turn the corresponding expander on its axis. The actuated expander will contact with the facing ends of the corresponding friction ring and expand said friction ring into contact with the opposing inside face of the outside flange 12b of pulley 12 so that said friction ring will be forced to rotate with the pulley. This rotation will be imparted to shaft 5 or 5a, as the case may be, through the corresponding end plate and its hub which is secured to the rotated shaft.

As will be noted from an inspection of Figure 9 the adjacent ends of shaft 5, 5a have axial key ways to receive the key 66 to maintain said ends aligned.

In order to operate the clutch there is provided a laterally movable shift bar 67 mounted on the spaced standards 68, 68 fixed to and upstanding from the frame 1. This shift bar may be shifted laterally, by the operator by means of the shift rod 69 whose forward end is pivoted to bar 67 and whose rear end works through a bearing in the extended end of the dog 41.

Depending from shift bar 67 there are the shift pins 70, 70 whose lower ends may be reduced, in diameter, as shown in Figure 1, and fitted between the spaced external annular flanges 71, 71 and 71a, 71a on the respective actuators 64, 64a and by suitable manipulation of the shift rod 69 the clutch may be shifted to drive either the cutting mechanism of the mower or the cutting mechanism of the edger or trimmer.

As best shown in Figure 11 there are the removable liners, as 72, within the friction rings 56, 56a and between said rings and the corresponding pulleys 12, 12a. The free ends of these liners are turned outwardly between the ends of said rings and the corresponding expanders 60, 60a; and around the friction rings 56, 56a there are similar liners 73, 73 which are in the form of split rings, as indicated in Figure 9. These liners are preferably of steel or other durable material and reduce the wear between the parts between which they are fitted and in case of wear they may be readily removed and replaced.

The drawings and description illustrate and describe what is now considered to be a preferred form of the invention by way of illustration only and not by way of limitation while the broad principle of the invention will be defined by the appended claims.

What I claim is:

1. An attachment for lawn mowers comprising, a supporting arm mounted, at one end out beyond the side of the mower to pivot on the mower frame about a transverse axis, grass cutting means on the free end of said arm, a guard plate disposed outwardly of the cutting means, connecting means carried by the arm and connected to said plate, spacing means between the arm and plate spacing the plate from said cutting means, and means arranged to move the arm about its pivot to vary the elevation of the cutting means.

2. An attachment for lawn mowers comprising, a supporting arm mounted, at one end, to pivot on the mower frame about a transverse axis and spaced outwardly from the side of the mower, grass cutting means on the free end of said arm, a guard plate disposed outwardly of the cutting means, connecting means carried by the arm and releasably connected to the guard plate, said guard plate being movable vertically with relation to the cutting means upon release of said connecting means, means arranged to move the arm about its pivot to vary the elevation of the cutting means and means on the mower operatively connected with, and adapted to drive, said cutting means.

3. An edger attachment for lawn mowers comprising, a driving shaft mounted on the mower, a supporting arm whose upper end has a bearing on said shaft, a frame mounted on the other end of said arm and positioned to revolve in a vertical plane beyond the side of the mower, a stationary blade on said frame, a vertically disposed guard plate spaced from said frame, releasable means connecting the plate to the frame, said plate being movable vertically with relation to said frame upon release of said connecting means, a rotatable cutter blade mounted between the fixed blade and guard plate, a driving connection between said shaft and rotatable blade whereby the rotatable blade is driven from the shaft.

4. An edger attachment for lawn mowers comprising, a driving shaft mounted on the mower, a supporting arm whose upper end has a bearing on said shaft, a frame mounted on the other end of said arm and positioned to revolve in a vertical plane beyond the side of the mower, a stationary blade on said frame, a vertically disposed guard plate spaced from said frame, releasable means connecting the plate to the frame, said plate being adjustable vertically with relation to the frame upon release of said connecting means, a rotatable cutter blade mounted between the fixed blade and guard plate, a driving connection between said shaft and rotatable blade whereby the rotatable blade is driven from the shaft and means, under the control of an operator, and connected with said arm and operative to vary the elevation of said arm and its appendants.

5. An attachment for lawn mowers comprising, a supporting arm mounted, at one end, to pivot on the mower frame about a transverse axis, grass cutting means on the free end of said arm and out beyond one side of the mower, a guard plate disposed outwardly of said cutting means, connecting means carried by the arm and connected to said guard plate, spacing means between the arm and the plate and spacing the plate from said cutting means and means arranged to move the arm about its pivot to move said cutting means to different elevations.

6. An attachment for lawn mowers comprising, a supporting arm mounted, at one end, to pivot on the mower frame about a transverse axis, grass cutting means on the free end of said arm and out beyond one side of the mower, a guard plate disposed outwardly of said cutting means, connecting means carried by the arm and connected to said guard plate, spacing means between the arm and the plate and spacing the plate from said cutting means and means arranged to move the arm about its pivot to adjust said cutting means vertically, and additional means to hold the cutting means forwardly of the mower or in elevated position.

7. An attachment for lawn mowers comprising, a supporting arm mounted, at one end, to pivot on the mower frame about a transverse axis, grass cutting means on the free end of said arm and out beyond one side of the mower, a guard plate disposed outwardly of said cutting means, connecting means carried by the arm and connected to said guard plate, spacing means between the arm and the plate and spacing the plate from said cutting means and means arranged to move the arm about its pivot to move said cutting means to different elevations and means on the mower for driving said cutting means.

8. An attachment for lawn mowers comprising, a supporting arm mounted, at one end, to pivot on the mower frame about a transverse axis, grass cutting means on the free end of said arm and positioned to revolve in a vertical plane beyond the side of the mower, a guard plate disposed outwardly of said cutting means, connecting means carried by the arm and connected to said guard plate, spacing means between the arm and the plate and spacing the plate from said cutting means and means arranged to move the arm about its pivot to move said cutting means to different elevations, said cutting means including a fixed blade and a rotatable blade and means on the mower operatively connected with the rotatable blade for rotating said blade.

9. An attachment for lawn mowers comprising, a driven shaft on the mower, a supporting arm one end of which has a bearing on the shaft, cutting means including a fixed blade and a rotatable blade on the other end of said arm and revolvable in a vertical plane beyond the side of the mower, blade driving means operated by the shaft and operatively connected with the rotatable blade and effective to rotate said blade, a guard plate disposed outwardly of said blades, connecting means carried by the arm and connected to the guard plate, and spacing means between the arm and the plate and spacing the plate from said blades.

10. An attachment for lawn mowers comprising, a supporting arm mounted, at one end, to pivot on the mower frame about a transverse axis, cutting means on the free end of said arm and revolvable in a vertical plane beyond the side of the mower, a guard plate disposed outwardly of the cutting means, releasable means connecting the plate to the arm, said plate being adjustable vertically relative to the cutting means upon release of said connecting means said arm being movable to upright position, adjustable means mounted on the mower frame and under the control of an operator and means connecting said arm and said adjustable means to maintain the arm and the cutting means in a selected elevated position.

11. An attachment for lawn mowers comprising, a supporting arm mounted, at one end, to pivot on the mower frame about a transverse axis, cutting means on the free end of said arm and revolvable in a vertical plane beyond the side of the mower, a guard plate disposed outwardly of the cutting means, releasable means connecting the plate to the arm, said plate being adjustable vertically relative to the cutting means upon release of said connecting means said arm being movable to forward position, adjustable means mounted on the mower frame and under the control of an operator and means connecting said arm and said adjustable means to maintain the arm and the cutting means in a selected forward elevated position.

12. An attachment for lawn mowers comprising, a driven shaft on the mower, a supporting arm one end of which has a bearing on the shaft, cutting means including a rotatable blade on the other end of said arm and revolvable in a vertical plane beyond the side of the mower, a guard plate disposed outwardly of the cutting means, releasable means connecting the plate to the arm, said plate being movable relative to the arm upon release of said connecting means, blade driving means on the shaft and means operatively connecting the driving means with the blade and effective to rotate said blade.

SALVATORE VELOTTA.

REFERENCES CITED

The following references are of record in the file of this patent:

UNITED STATES PATENTS

| Number | Name | Date |
|---|---|---|
| 939,926 | Smith | Nov. 9, 1909 |
| 1,054,320 | Slatter | Feb. 25, 1913 |
| 1,445,515 | Jones et al. | Feb. 13, 1923 |
| 1,718,058 | Mickulecky | June 18, 1929 |
| 1,953,186 | Mueller | Apr. 3, 1934 |
| 2,172,786 | Bishir | Sept. 12, 1939 |
| 2,179,837 | Wolkoff | Nov. 14, 1939 |
| 2,410,196 | Benthall | Oct. 29, 1946 |
| 2,486,458 | Bender | Nov. 1, 1949 |

FOREIGN PATENTS

| Number | Country | Date |
|---|---|---|
| 354,311 | Great Britain | Aug. 4, 1931 |
| 498,054 | Great Britain | Jan. 3, 1939 |